United States Patent
Wang et al.

(10) Patent No.: US 7,388,977 B2
(45) Date of Patent: *Jun. 17, 2008

(54) TEST SYSTEM AND METHOD FOR PORTABLE ELECTRONIC APPARATUS

(75) Inventors: Chih-Cheng Wang, Tainan (TW); Bwo-Yi Lee, Taipei Hsien (TW); Hung-Yang Wu, Taoyuan Hsien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 672 days.

This patent is subject to a terminal disclaimer.

(21) Appl. No.: 10/964,610

(22) Filed: Oct. 15, 2004

(65) Prior Publication Data

US 2005/0231595 A1 Oct. 20, 2005

(30) Foreign Application Priority Data

Nov. 27, 2003 (TW) .............................. 92133433 A

(51) Int. Cl.
*G06K 9/00* (2006.01)

(52) U.S. Cl. ..................... 382/141; 702/57; 348/187; 248/187.1

(58) Field of Classification Search ............... 382/141, 382/305; 702/57, 118; 73/29.01, 53.01, 73/61.75, 61.45, 31.05; 714/734, 703, 712; 607/27; 348/182, E17.006, 187, 222.1, 188; 248/187.1; 324/698, 439; 422/83
See application file for complete search history.

(56) References Cited

U.S. PATENT DOCUMENTS 7,200,497 B2 * 4/2007 Wang et al. .................. 702/57

* cited by examiner

*Primary Examiner*—Sheela C Chawan
(74) *Attorney, Agent, or Firm*—Rabin & Berdo, PC

(57) ABSTRACT

A test system for testing a portable electronic apparatus having a digital image capture module and a test interface is described. The test system has at least a sender, a holder, and a controller. The holder is used to hold the portable electronic apparatus. The controller is used to control the sender to send at least a test slide, according to a predetermined procedure, to a position. When the slide is moved to the position, the controller commands the portable electronic apparatus, via the test interface, to capture the image on the test slide and then performs a test on the image data. The test system uses an automatic control and a shop floor system to achieve an automatic test.

19 Claims, 2 Drawing Sheets

TEST SYSTEM AND METHOD FOR PORTABLE ELECTRONIC APPARATUS

RELATED APPLICATIONS

The present application is based on, and claims priority from, Taiwan Application Serial Number 92133433, filed Nov. 27, 2003, the disclosure of which is hereby incorporated by reference herein in its entirety.

BACKGROUND

1. Field of Invention

The present invention relates to a test system. More particularly, the present invention relates to a test system for testing a portable electronic apparatus. The portable electronic apparatus has a digital image capture module.

2. Description of Related Art

Because of the fast development of communication technology, cell phones have become important and popular communication tools. Additionally, owing to the development of image technology, digital cameras have become the main-stream of image-capturing products. Therefore, a cell phone having a digital camera will be an important consumer electronic product in the future.

In the manufacturing process of a cell phone having a digital camera, the test of the product is a very important part. To determine quickly and efficiently whether the product meets a predetermined standard is very important. It also helps reduce the cost of manufacturing.

Traditionally, the test of the cell phone having a digital camera is accomplished by multiple test station for only one type of cell phone. Only one test slide is used in one station to test a specific function of the cell phone. The test result is viewed and judged by human eyes. Human reading of the serial number of the cell phone and changing of the test slide are time-consuming processes and easy incur mistakes. Therefore, the traditional test method has the disadvantages of manpower consumption, low speed, and low accuracy of judging the test result.

Moreover, if an efficient shop floor system is not included in the test, repeated or unnecessary tests may happen. Because there are many different types of cell phones, test equipment may be wasted if one test station is only suitable for a specific type of cell phone.

SUMMARY

It is therefore an objective of the present invention to provide a test system for performing a test on a portable electronic apparatus having an image capturing module. The test system is fast, simple, and requires little manpower.

It is another objective of the present invention to provide a test system for multiple portable electronic apparatus types and to allow multiple automatic tests using multiple test slides in a single test station. The electronic apparatus has an image capturing module.

It is still another objective of the present invention to provide a test system integrated with a shop floor system for effective production.

It is yet another objective of the present invention to provide a test system that only requires changing the holder for testing different types of portable electronic apparatuses.

In accordance with the foregoing and other objectives of the present invention, a test system for testing a portable electronic apparatus having a digital image capture module and a test interface is described. The test system includes at least a sender, a holder, and a controller. The portable electronic apparatus is, for example, a cell phone. The digital image capture module is, for example, a digital camera.

The holder holds the portable electronic apparatus. The controller commands the sender to send at least a test slide, according to a predetermined procedure, to a position. The position is suitable for the portable electronic apparatus to perform image capture.

When the slide is moved to the position, the controller commands the portable electronic apparatus, via the test interface, to capture the image on the test slide. The image data generated by the image capturing is sent to the controller via the test interface. The controller performs a test on the image data to determine whether the image data meets a predetermined test standard.

The sender mentioned above includes a servo motor, a servo controller, a slide cylinder, and a fixture. The fixture is used to fix the test slide. The servo controller controls the servo motor. The servo motor drives the slide cylinder. The slide cylinder moves the fixture and the test slide to the position.

In the test system, the controller can include a computer. The computer controls the sender, so that the sender moves the test slide to the position according to the predetermined procedure. When the test slide is moved to the position, the computer commands the portable electronic apparatus, via the test interface, to capture the image on the test slide. The computer receives the image data and performs a test on the image data to determine whether the image data meets the predetermined test standard.

The computer mentioned above reads the serial number of the portable electronic apparatus, via the test interface, and sends the serial number to a server. The server has a data base. The server compares the serial number with the data base and determines the test status of the portable electronic apparatus and the procedure.

The image data generated by the image capturing is sent to the computer via the test interface. The computer performs a test on the image data to determine whether the image data meets a predetermined test standard. The computer sends the test result of the image data to the server. The server adds the serial number and the test result to the data base.

A test method for testing a portable electronic apparatus is also described. The portable electronic apparatus has a digital image capture module and a test interface. The test method includes the following steps. First, a portable electronic apparatus is held by a holder. Next, a test slide is sent to a position according to a predetermined procedure by a sender. The sender is controlled by a controller and the position is suitable for the portable electronic apparatus to perform image capture. Next, the controller commands the portable electronic apparatus, via the test interface, to perform image capturing when the test slide is moved to the position. Next, the image data is sent to the controller via the test interface. The image data is generated by the portable electronic apparatus after image capturing. Next, a test is performed, by the controller, on the image data to determine whether the image data meets a predetermined test standard.

In the method mentioned above, the controller can include a computer. The computer determines the predetermined procedure, controls the sender, and performs the test on the image data. The method can further include using a computer to read the serial number of the portable electronic apparatus, via the test interface, and to send the serial number to a server and compare the serial number with the data base to determine the test status of the portable electronic apparatus and to determine the predetermined procedure. The server has a data base. The data base stores the serial numbers of a plurality of portable electronic apparatuses and the corresponding test results.

The method can further include, when the test slide is moved to the position and after image capturing, sending the serial number of the portable electronic apparatus and the test result of the image data, by a computer, to the server and storing the serial number and the test result in the data base.

In summary, because the controller automatically controls the predetermined procedure, the object of a fast, simple, and low manpower test system for the portable electronic apparatus is achieved. Moreover, because the test system automatically performs the test using a plurality of different test slides according to the predetermined procedure, the test system can be used for performing the test on a plurality of different types of portable electronic apparatus in a single station. Additionally, because the test system can be connected to the server, the test system integrated with a shop floor system can achieve the object of effective production. The holder is interchangeable, so testing different types of portable electronic apparatus is achieved by changing the holder.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
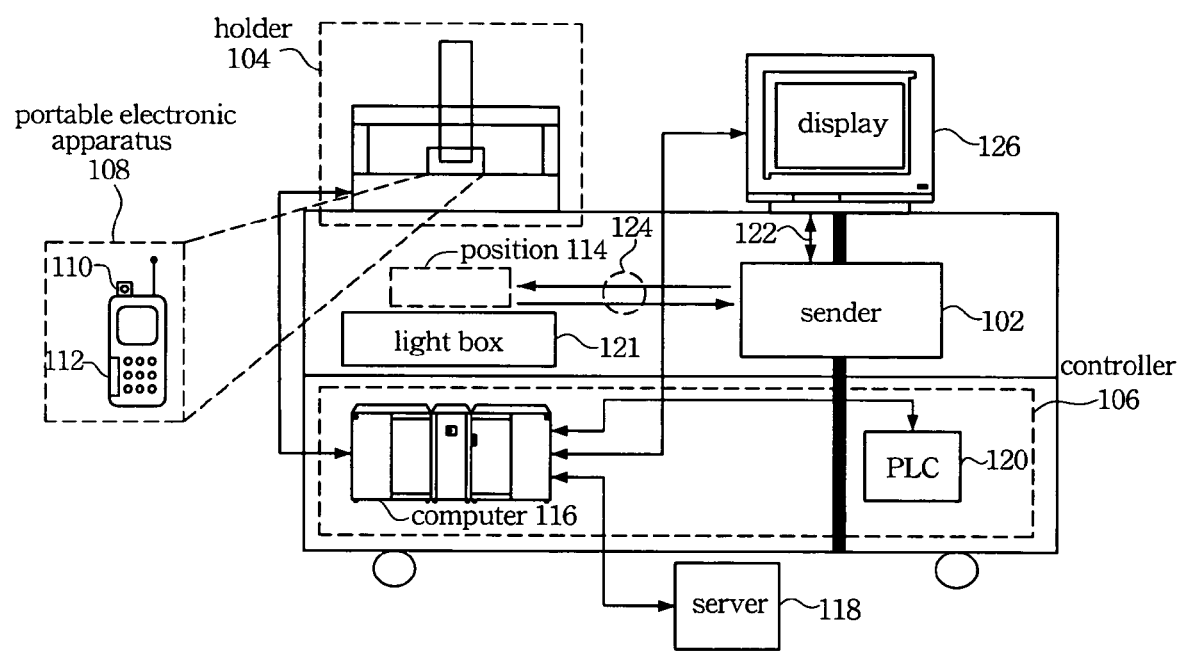
FIG. 1 is a diagram illustrating a structure of the test system of the preferred embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
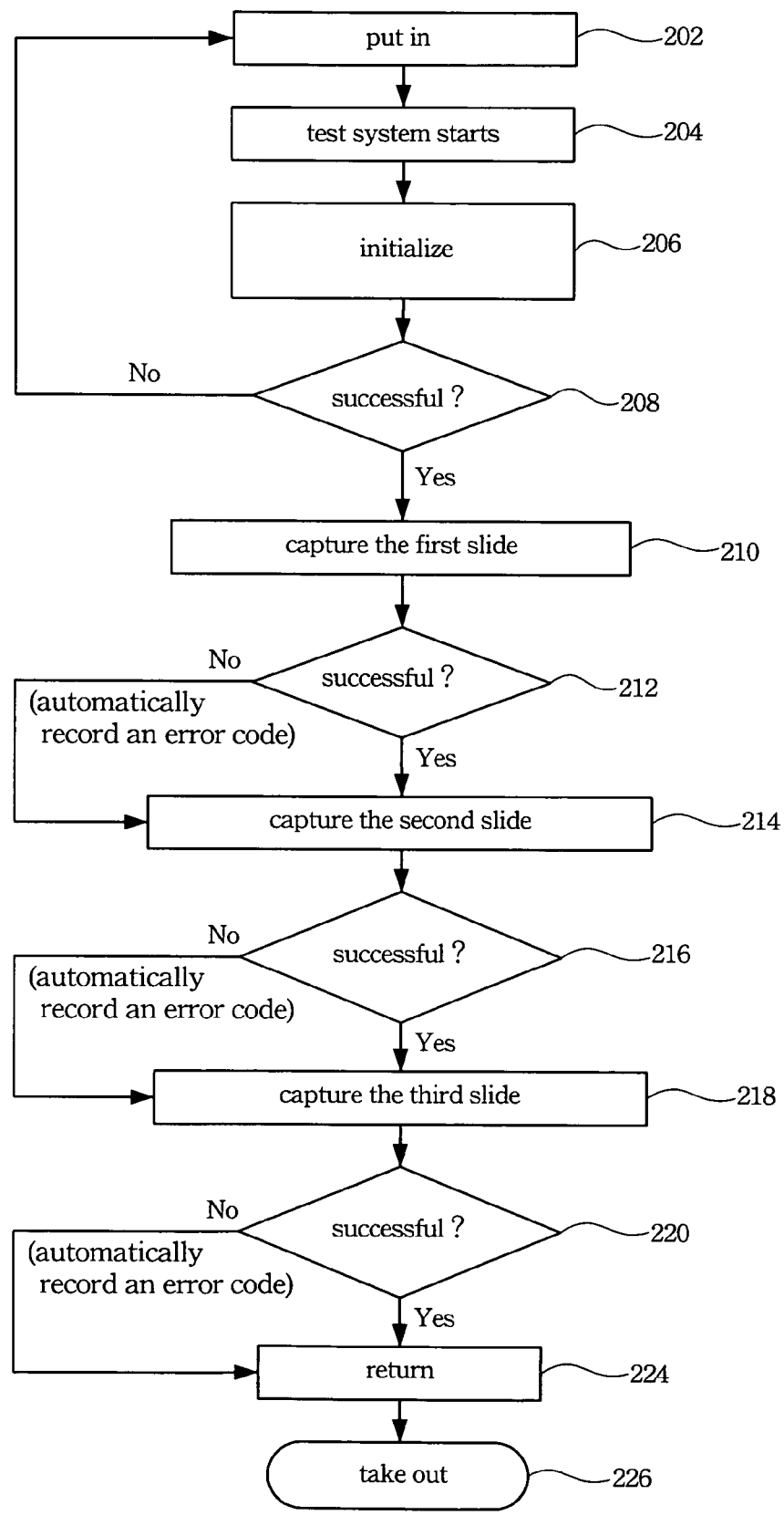
FIG. 2 is a diagram illustrating a flow chart of the test method of the preferred embodiment.

FIG. 1 is a diagram illustrating a structure of the test system 100 of the preferred embodiment of the invention. FIG. 2 is a diagram illustrating a flow chart of the test method of the preferred embodiment. With reference to FIG. 1 and FIG. 2, the test system 100 is used to test a portable electronic apparatus 108. The portable electronic apparatus 108 has a digital image capture module 110 and a test interface 112. The portable electronic apparatus 108 is, for example, a cell phone. The digital image capture module 110 is, for example, a digital camera module. The test interface 112 is, for example, an RS 232.

The test system 100 includes a sender 102, a holder 104, and a controller 106. The controller 106 can include a computer 116. The holder 104 is used to hold a portable electronic apparatus 108. The holder 104 includes, for example, a jig cylinder, a pen cylinder, or a reed sensor for securely holding the portable electronic apparatus 108. The holder 104 is interchangeable, so testing different types of portable electronic apparatus 108 is achieved by changing the holder 104.

At the beginning of the test, the portable electronic apparatus 108 is put into the holder 104 (step 202) and the test system 100 is started (step 204). Next, the computer 116 commands the holder 104 to hold securely the portable electronic apparatus 108. When the holder 104 securely holds the portable electronic apparatus 108, a plurality of pins are provided by the holder 104 to touch the test interface 112, so that the portable electronic apparatus 108 can communicate with the controller 106.

Meanwhile, the computer 116 informs the portable electronic apparatus 108, via the test interface 112, to turn on, to read the serial number of the portable electronic apparatus 108, and to send the serial number of the portable electronic apparatus 108 to the computer 116. The computer 116 deletes the image data in the portable electronic apparatus 108 (step 206).

The computer 116 sends the serial number of the portable electronic apparatus 108 to the server 118. There is a data base in the server 118. The data base stores the serial numbers of a plurality of portable electronic apparatuses and the corresponding test results.

The serial number of the portable electronic apparatus 108 is compared with the serial numbers stored in the data base to determine the test status of the portable electronic apparatus 108 (step 208). For example, when the portable electronic apparatus 108 is found to have been tested, there is no need to perform the next step and the portable electronic apparatus 108 can be replaced. When the portable electronic apparatus 108 is found to have not yet been tested, the next step can be performed. The data base is, for example, a shop floor system. The step of comparing the serial number with the data base is, for example, a portion of the flow control management.

Next, computer 116 controls the sender 102 to move at least a test slide, according to a predetermined procedure, to a position 114. The position 114 is a position suitable for the portable electronic apparatus 108 to perform image capturing. When the slide is moved to the position 114, the computer 116 commands the portable electronic apparatus 108, via the test interface 112, to capture the image on the test slide (step 210).

For example, the test system 100 performs an automatic test on the portable electronic apparatus 108 using 3 test slides. The number 3 is just an example. Users can determine a proper number of test slides according to their need. The sender 102 moves the first test slide to the position 114. The computer 116 informs the portable electronic apparatus 108, via the test interface 112, to perform image capturing (step 210). Then the computer 116 reads the image data via the test interface 112. The image data is generated after the image capturing. The computer 116 performs a test on the image data to determine whether the image data meets a predetermined test standard (step 212).

Meanwhile, the image data is sent to the display 126 via the computer 116, so that a user can see the result of image capturing on the display 126. Generally speaking, the image size on the display 126 is far larger than that on the built-in screen of the portable electronic apparatus 108. Therefore, watching the result of the image capturing on the display 126 is convenient for the user when the user is detecting errors in the image. A light box 121 can be placed at the position 114. When moved to the position 114, the test slide is illuminated by the light box 121 for image capturing.

The predetermined test standard mentioned above is, for example, a resolution, brightness, or saturation standard. For example, the test slides can be a standard color bar or other types of test slides. The computer 116 compares the image data with the standard reference image data and performs a calculation to determine whether the error is within tolerance (step 212). The comparison and calculation mentioned above are, for example, comparing and calculating the RGB differences between the image data and the standard reference image data.

A test result is then generated by the computer 116. The computer 116 sends the test result and the serial number of the portable electronic apparatus 108 to the server 118. The server 118 stores the test result and the serial number of the portable electronic apparatus 108 in the data base.

For example, if the test result of the first test slide is determined by the computer 116 to not meet the predetermined test standard, the computer 116 sends an error code to the server 118 and the error code is stored in the data base. Because the test system 100 can be connected to the server 118, the test system 100 integrated with a shop floor system can achieve the object of effective production.

After the first test slide finishes its test, the sender 102 retrieves the first test slide and automatically moves the second test slide to the position 114. The computer 116 informs the portable electronic apparatus 108, via the test interface 112, to perform image capturing (step 214). The following steps (step 216) are similar with those of the first test slide. For simplicity, the same description is omitted.

After the second test slide finishes its test, the sender 102 retrieves the second test slide and automatically moves the third test slide to the position 114 to perform similar steps of the second test slide (step 218 and step 220). Thus, the test using 3 test slides is accomplished by repeatedly performing the same steps. After the third test slide finishes its test, the test system returns to the initial state and settings (step 224). Next, the portable electronic apparatus 108 is taken from the holder 104 and the test finishes.

Because the controller 106 automatically controls the predetermined procedure, the object of a fast, simple, and low manpower test system for testing the portable electronic apparatus 108 is achieved. Moreover, because the test system 100 automatically performs the test using a plurality of different test slides according to the predetermined procedure, the test system 100 can be used for performing the test on a plurality of different types of portable electronic apparatus 108 in a single station.

The sender 102 includes, for example, a servo motor, a servo controller, a slide cylinder, and a fixture. The fixture is used to fix the test slide. The slide cylinder moves the fixture and the test slide, in the direction 124, to the position 114. The servo motor controls the altitude 122 of the sender 102, so that the slide cylinder can retrieve different test slides according to the predetermined procedure. The servo controller controls the servo motor and determines whether the servo motor is in the right position. The slide cylinder, the fixture, and the servo motor cooperate to finish the action of changing the test slides.

The slide cylinder includes, for example, a Sport, 3-position solenoid valve. The 5-port, 3-position solenoid valve controls all pneumatic switches. An infrared detector is optionally used to detect whether the action of changing the test slide is completely finished, and whether the fixture is in the right position. Further, a non-fuse breaker, a solenoid valve contact, and a transformer controller are used to control the power input and transformation.

The sender mentioned above is just an example. Any apparatus capable of moving the test slides and changing the test slides can be an alternative. Conveyors and robot manipulators are examples of the sender.

Moreover, the controller 106 includes, for example, a programmable logic controller 120 (PLC). The programmable logic controller 120 sends a status code, according to the predetermined procedure and the position of the test slide, to the computer 116, and the computer 116 corrects the predetermined procedure in response to the status code.

For example, the input, output, link, and logic analysis function of the PLC, together with the control signal, are used to send a status code of whether the test system 100 is ready to the computer 116. For example, sending a hexadecimal number M represents that the test system 100 is ready and wafting for the next instruction from the computer 116. Sending 11, 12, 13, and 14 respectively represent the first test slide, the second test slide, the third test slide, and the forth test slide are in the position 114 and ready for image capturing. When an abnormal situation of moving or changing the test slide occurs, the abnormal indication light of the test system 100 is turned on and the test system 100 stops. The programmable logic controller 120 sends an error code to the computer 116 and the computer 116 issues a reset command to the test system 100. The programmable logic controller 120 and status codes mentioned above are just examples; any controlling apparatus and status code can be an alternative.

Although the present invention has been described in considerable detail with reference to certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A test system for testing a portable electronic apparatus having a digital image capture module and a test interface, the test system comprising:
   a sender;
   a holder for holding the portable electronic apparatus; and
   a controller for commanding the sender to send at least a test slide, according to a predetermined procedure, to a position suitable for the portable electronic apparatus to perform image capturing, wherein when the slide is moved to the position, the controller commands the portable electronic apparatus, via the test interface, to capture an image on the test slide;
   wherein image data generated by the image capturing is sent to the controller via the test interface, and the controller performs a test on the image data to determine whether the image data meets a predetermined test standard.

2. The test system of claim 1, wherein the portable electronic apparatus is a cell phone and the digital image capture module is a digital camera module.

3. The test system of claim 1, wherein the predetermined procedure is sending the slides one after another to the position.

4. The test system of claim 1, wherein the sender further comprises a servo motor, a servo controller, a slide cylinder, and a fixture, the servo controller controls the servo motor, the servo motor drives the slide cylinder, the fixture is used to fix the test slide, and the slide cylinder moves the fixture and the test slide to the position.

5. The test system of claim 1, wherein the controller further comprises a computer, and the computer controls the sender, the sender moves the test slide to the position according to the predetermined procedure, and when the test slide is moved to the position, the computer commands the portable electronic apparatus, via the test interface, to capture the image on the test slide.

6. The test system of claim 5, wherein the controller further comprises a programmable logic controller, the programmable logic controller sends a status code to the computer according to the predetermined procedure and the position of the test slide, and the computer corrects the predetermined procedure according to the status code.

7. The test system of claim 1, wherein the controller further comprises a computer, and the computer receives the image data and performs the test on the image data to determine whether the image data meets a predetermined test standard.

8. The test system of claim 7, wherein the computer reads a serial number of the portable electronic apparatus, via the test interface, and sends the serial number to a server, the result of the test performed on the image data is sent to the server, and the server establishes a data base according to the serial number and a test result.

9. The test system of claim 8, wherein the server establishes the data base according to a plurality of portable electronic apparatuses.

10. The test system of claim 9, wherein the computer reads the serial number of another portable electronic apparatus, via the test interface, and sends the serial number to the server, and the server compares the serial number with the data base and determines the test status of said another portable electronic apparatus and the predetermined procedure.

11. The test system of claim 1, wherein the test interface is RS 232.

12. The test system of claim 1, further comprising a light box, wherein when the test slide is moved to the position, the test slide is illuminated by the light box for capture by the portable electronic apparatus.

13. A test method for testing a portable electronic apparatus, the portable electronic apparatus having a digital image capture module and a test interface, wherein the test method comprises:

holding a portable electronic apparatus with a holder;

sending at least a test slide to a position according to a predetermined procedure by a sender, wherein the sender is controlled by a controller and the position is suitable for the portable electronic apparatus to perform image capturing;

commanding the portable electronic apparatus by the controller, via the test interface, to capture an image on the test slide when the test slide is moved to the position;

sending image data to the controller via the test interface, wherein the image data is generated by the portable electronic apparatus after image capturing; and performing a test, by the controller, on the image data to determine whether the image data meets a predetermined test standard.

14. The method of claim 13, wherein the portable electronic apparatus is a cell phone and the digital camera module is a digital camera module.

15. The method of claim 13, wherein the controller further comprises a computer, and the computer determines the predetermined procedure, controls the sender, and performs the test on the image data.

16. The method of claim 13, further comprising using a computer to read a serial number of the portable electronic apparatus, via the test interface, and to send the serial number to a server.

17. The method of claim 16, wherein the server has a data base, the serial numbers of a plurality of portable electronic apparatuses and corresponding test results are stored in the data base, and the method further comprises:

comparing the serial number with the data base to determine test status of the portable electronic apparatus and to determine the predetermined procedure.

18. The method of claim 17, further comprising, when the test slide is moved to the position and after image capturing, sending the serial number of the portable electronic apparatus and the test result of the image data, by a computer, to the server and storing the serial number and the test result in the data base.

19. The method of claim 13, wherein the predetermined procedure is sending the slides, one after another, to the position.

* * * * *